United States Patent
Klimes

(10) Patent No.: US 8,671,679 B2
(45) Date of Patent: Mar. 18, 2014

(54) FAST FILL TANDEM MASTER CYLINDER

(75) Inventor: Milan Klimes, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 881 days.

(21) Appl. No.: 12/832,988

(22) Filed: Jul. 9, 2010
(Under 37 CFR 1.47)

(65) Prior Publication Data

US 2012/0006018 A1   Jan. 12, 2012

(51) Int. Cl.
*B60T 11/16* (2006.01)

(52) U.S. Cl.
USPC .............................................. 60/578; 60/589

(58) Field of Classification Search
USPC .......................................... 60/562, 578, 589
See application file for complete search history.

(56) References Cited

U.S. PATENT DOCUMENTS

| | | | | |
|---|---|---|---|---|
| 4,078,386 A * | 3/1978 | Ewald | ............................... | 60/589 |
| 4,132,073 A * | 1/1979 | Ewald | ............................... | 60/589 |
| 4,156,348 A * | 5/1979 | Brown | ............................. | 60/578 |
| 4,170,386 A | 10/1979 | Shutt | | |
| 4,254,624 A | 3/1981 | Gaiser | | |
| 4,441,320 A | 4/1984 | Gaiser | | |
| 4,472,940 A | 9/1984 | Kubota | | |
| 4,499,729 A | 2/1985 | Gaiser | | |
| 4,503,677 A * | 3/1985 | Crumb et al. | .................... | 60/562 |
| 4,559,781 A | 12/1985 | Steer et al. | | |
| 4,718,234 A * | 1/1988 | Steer | ............................... | 60/562 |
| 4,790,138 A * | 12/1988 | Steer | ............................... | 60/578 |
| 6,698,202 B2 * | 3/2004 | Ogiwara et al. | ................ | 60/578 |
| 7,340,894 B2 * | 3/2008 | Miyahara et al. | ............... | 60/526 |
| 7,430,864 B2 * | 10/2008 | Goto | ................................ | 60/562 |
| RE40,573 E | 11/2008 | Ogiwara et al. | | |
| 7,987,671 B2 * | 8/2011 | Gaffe et al. | ..................... | 60/562 |
| 2004/0065084 A1 | 4/2004 | Coleman et al. | | |

FOREIGN PATENT DOCUMENTS

GB   2000235 A   1/1979

OTHER PUBLICATIONS

European Search Report in corresponding European application (i.e., EP 11 17 3029), completed Nov. 3, 2011 (6 pages).

* cited by examiner

*Primary Examiner* — Thomas E Lazo
(74) *Attorney, Agent, or Firm* — Maginot, Moore & Beck

(57) ABSTRACT

A fast fill braking system includes a master cylinder, a primary pressure chamber having a first chamber portion located forwardly of a second chamber portion, the first chamber portion having a diameter larger than a diameter of the second chamber portion, and a primary piston including a first piston portion positioned within the primary pressure chamber and a second piston portion extending out of the primary pressure chamber, the first piston portion having a diameter (i) larger than a diameter of the second piston portion, and (ii) complementary to the diameter of the second chamber portion.

15 Claims, 7 Drawing Sheets

FAST FILL TANDEM MASTER CYLINDER

FIELD

The invention relates to braking systems, and in particular to a fast-fill master cylinder.

BACKGROUND

A braking system typically includes a master cylinder which is fluidly coupled to downstream braking circuits. During an initial period of actuation, the master cylinder generates fluid pressure in downstream braking circuits and displaces fluid in order to place friction members of the braking system, e.g., brake pads, against complementary surfaces, e.g., a rotor or a drum. In certain circumstances, brake pads may be displaced away from the rotor, thereby generating a gap between the brake pads and the rotor. When fully actuated, the brake pads are in contact with the rotor, and thereafter the brake pads perform the desired braking function. When actuation is first initiated, however, the brake pads are not in physical contact with the rotor. This lack of physical contact results in minimal pressure buildup in the downstream braking circuits, which results in lack of braking. In addition to the lack of braking, an operator of the vehicle may receive a different pedal feedback when the actuation is first initiated as compared to the pedal feedback the operator receives once the brake pads are in contact with the rotor. This difference in the pedal feedback can be unsettling to the operator.

One way to shorten the lack of braking and reduce the unsettling difference in the pedal feedback when the actuation is first initiated is to displace a larger quantity of fluid within the braking system in order to quickly take up the gap, described above. This method is typically referred to as a fast fill braking system. In order to transfer the larger quantity of fluid, the braking system may include an actuating piston in the master cylinder with a larger diameter as compared to an actuating piston in a braking system which is not designed to provide the desired fast fill function. A larger diameter piston moves a larger volume of fluid, thereby quickly filling the downstream braking circuits.

A larger piston, however, requires a larger force to move. While during the initial period of actuation the force required to move the larger piston is relatively low, after the initial period of actuation a larger force is required to move the piston than is needed in a system with nominally sized piston. This additional force necessitates a larger boost system, known in the art.

Therefore, it is highly desirable to provide a master cylinder construction which can minimize the lack of braking and reduce the unsettling difference in the pedal feedback when the actuation is first initiated by rapidly increasing pressure in the downstream braking circuits, and without the need to use a larger boost system.

SUMMARY

According to one embodiment of the present disclosure, there is provided a fast fill braking system. The fast fill braking system includes a master cylinder, a primary pressure chamber having a first chamber portion located forwardly of a second chamber portion, the first chamber portion having a diameter larger than a diameter of the second chamber portion, and a primary piston including a first piston portion positioned within the primary pressure chamber and a second piston portion extending out of the primary pressure chamber, the first piston portion having a diameter (i) larger than a diameter of the second piston portion, and (ii) complementary to the diameter of the second chamber portion.

According to one embodiment of the present disclosure, there is provided a fast fill braking system. The fast fill braking system includes a brake cylinder and a primary pressure chamber. The primary pressure chamber is fixedly defined within the cylinder and includes a first chamber portion having a first diameter, and a second substantially cylindrical chamber having a second diameter. The second diameter is less than the first diameter. The fast fill braking system further includes a primary piston which includes a first large diameter portion positioned within the primary pressure chamber, and a second small diameter portion. The second small diameter portion extends rearwardly of the first large diameter portion and has a diameter smaller than a diameter of the first large diameter portion. The fast fill braking system further includes a first annular seal mounted on the first large diameter portion and (i) configured to sealingly engage the second substantially cylindrical chamber when the first large diameter portion is within the second substantially cylindrical chamber and the primary piston is moving in a forward direction, and (ii) configured to not sealingly engage the first chamber portion when the first large diameter portion is within the first chamber portion and the primary piston is moving in the forward direction.

DESCRIPTION

Figure 1:
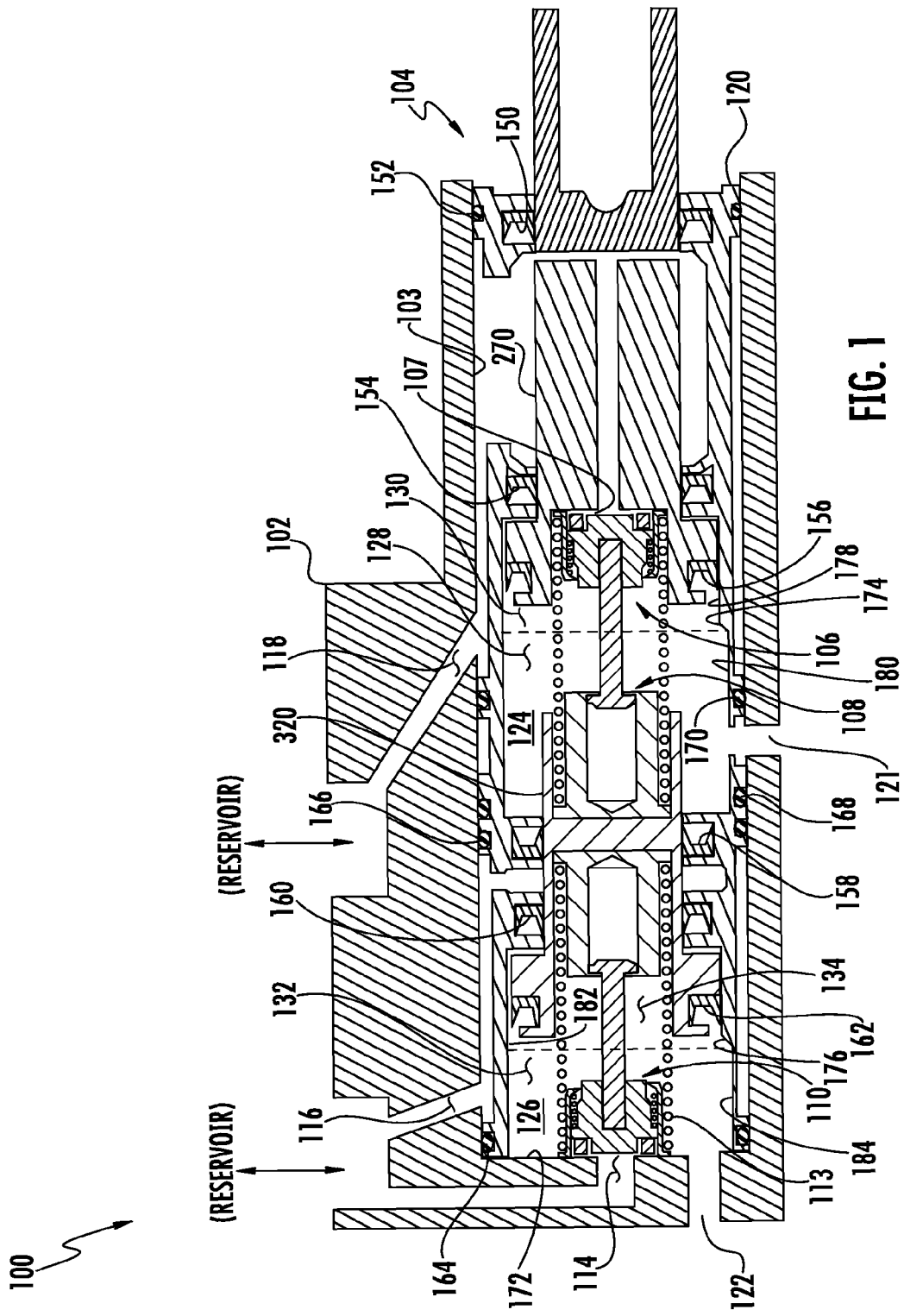
FIG. 1 depicts a partial cross sectional view of a braking system including a master cylinder assembly, a primary piston assembly, a secondary piston assembly, poppet valve assemblies, and a sleeve assembly, shown in a first position.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a partial cross sectional view of a braking system 100 is depicted. The braking system 100 includes a master cylinder assembly 102, a primary piston assembly 104, a first poppet valve assembly 106, a secondary piston assembly 108, and a second poppet valve assembly 110. A reservoir (not shown) is fluidly coupled to the master cylinder assembly 102 via fluid channels 114, 116 and 118.

The master cylinder assembly is in fluid communication with downstream braking circuits (not shown) via fluid channels 121 and 122. The master cylinder assembly 102 includes a bore 103.

The poppet valve assembly 106 is biased away from the secondary piston assembly 108 by a spring 112. The secondary piston assembly 108 is biased away from the poppet valve assembly 110 by a spring 113. The first and second springs 112 and 113 may have the same or different spring constants. In addition, these springs 112 and 113 may be constructed to provide uniform spring stiffness (i.e., a constant spring constant over the compression range of the spring) or non-uniform spring stiffness (i.e., varying spring constants over the compression range of the spring).

A sleeve assembly 120 is sealingly coupled to the bore 103 via seals 152, 164, 166, 168, and 170. The sleeve assembly 120 includes seal housings for seals 150, 152, 154, 156, 158, 160, 162, 164, 166, 168, and 170. The seals 150, 154, and 156 seal the primary piston assembly 104 against the sleeve assembly 120. Also, the seals 158, 160, and 162 seal the sleeve assembly against the secondary piston assembly 108.

The master cylinder assembly 102, the primary piston assembly 104, and the sleeve assembly 120 define a primary pressure chamber 124. The primary pressure chamber 124 is divided into two chamber portions 128/130 as depicted by the phantom line in FIG. 1. The first chamber portion 128 is defined by a larger diameter of the sleeve assembly 120. The second chamber portion 130 is defined by a smaller diameter of the sleeve assembly 120. As depicted in FIG. 1, the first chamber portion 128 is positioned forwardly of the second chamber portion 130.

Similarly, the master cylinder assembly 102, the secondary piston assembly 108, and the sleeve assembly 120 define a secondary pressure chamber 126. The secondary pressure chamber 126 is divided into two chamber portions 132/134 as depicted by the phantom line in FIG. 1. The first chamber portion 132 (also referred to as the third chamber portion) is defined by a larger diameter of the sleeve assembly 120. The second chamber portion 134 (also referred to as the fourth chamber portion) is defined by a smaller diameter of the sleeve assembly 120. As depicted in FIG. 1, the third chamber 132 is positioned forwardly of the fourth chamber 134.

The primary and secondary pressure chambers 124 and 126 are in continuous fluid communication with the downstream braking circuits (not shown), and in selective fluid communication with the reservoir (not shown). As described further below, these chambers 124 and 126 are configured to pressurize fluid therein, thereby pressurizing fluid within the downstream braking circuits (not shown), in response to leftward movement of the primary piston assembly 104 (as depicted in FIG. 1).

The primary piston assembly 104 defines a cavity 107. The cavity 107 is configured to receive the first poppet valve assembly 106. The first poppet valve assembly 106 isolates the primary pressure chamber 124 from the reservoir (not shown) by sealing against the primary piston assembly 104, as further described below. The secondary piston assembly 108 also defines a cavity 111. The second poppet assembly 110 is aligned with the second cavity 111. Similarly, the second poppet valve assembly 110 isolates the secondary pressure chamber 126 from the reservoir (not shown) by sealing on an end wall 172.

The sleeve assembly 120 includes diameter transition points 174 and 176. The diameter of the sleeve assembly 120 changes at these diameter transition points. For example, the diameter increases from right to left across the diameter transition point 174 from a smaller diameter 178 to a larger diameter 180. Similarly, the diameter increases from right to left across the diameter transition point 176 from a smaller diameter 182 to a larger diameter 184. The first and second chamber portions 128 and 130 or the third and fourth chamber portions 132 and 134 are also defined about the diameter transition points 174 and 176, respectively. The sleeve assembly 120 may be constructed in a uniform manner about the diameter transition points 174 and 176 (i.e., a uniformly circular construction with two diameters), or may be, as depicted in FIG. 1, constructed in a non-uniform manner (i.e., only annular portions of the inside of the sleeve assembly 120 formed with the larger diameter).

Figure 2:
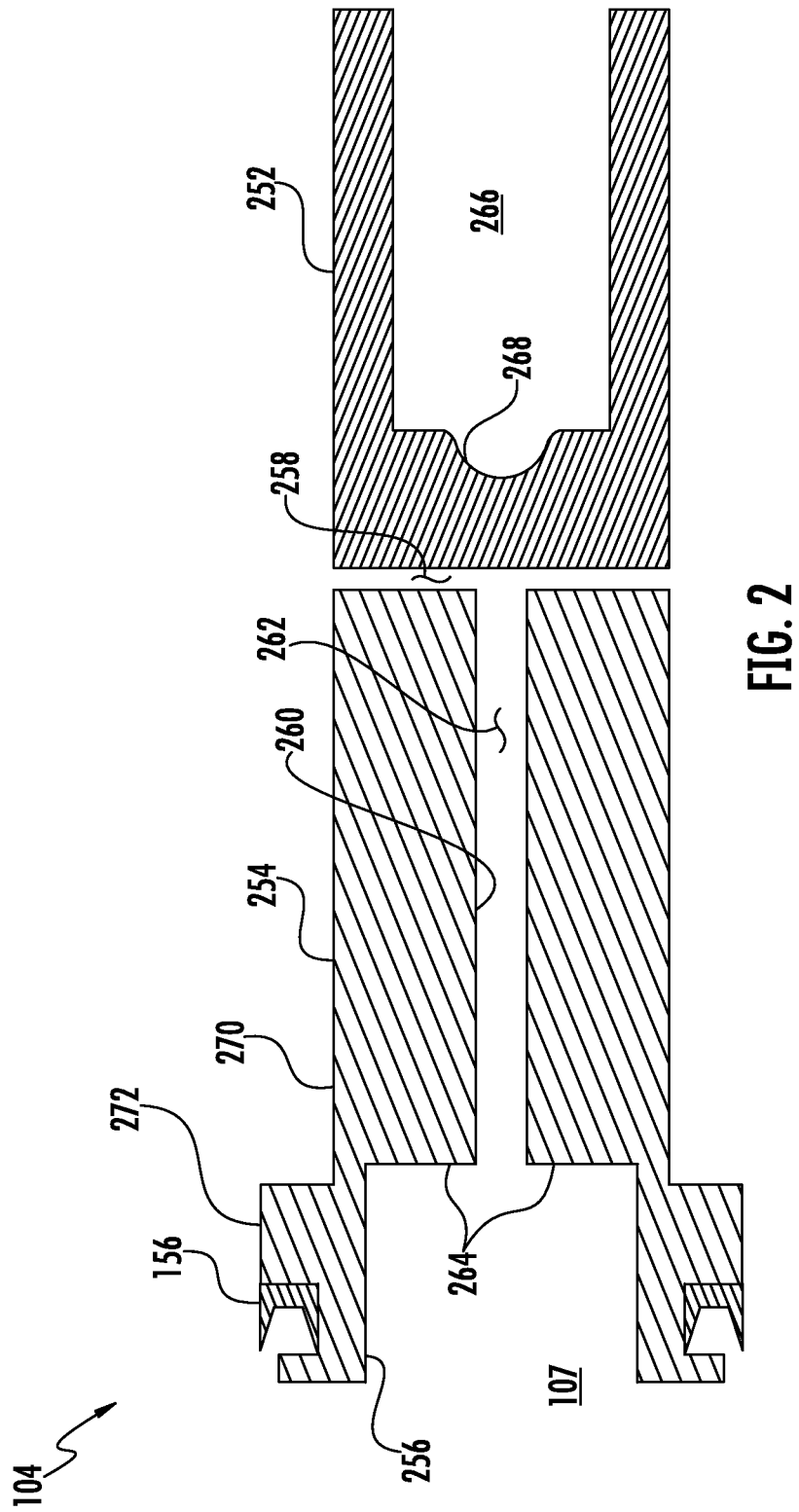
FIG. 2 depicts a cross sectional view of the primary piston assembly, depicted in FIG. 1.

Referring to FIG. 2, a cross sectional view of the primary piston assembly 104 is depicted. The primary piston assembly 104 includes a rear portion 252, a central portion 254, and a forward portion 256. The rear portion 252 is connected to the central portion 254 providing a gap 258 between the two portions. The central portion 254 includes a bore 260 thereby providing a fluid channel 262.

The rear portion 252 defines a cavity 266 with an interface 268 for receiving an input shaft (not shown). The input shaft (not shown) and the cavity 266 interface in a fixed manner, e.g., in a press fit manner. Therefore, movement of the input shaft (not shown) generates movement of the primary piston assembly 104 in response thereto.

The forward portion 256 includes a seal housing for the seal 156. The interface between the central portion 254 and the forward portion 256 defines the cavity 107 which is in fluid communication with the fluid channel 262. A sealing surface 264 is provided at a forward area of the central portion 254 (see also FIG. 1). The central portion 254 also defines an outer diameter 270 which is smaller than an outer diameter 272 of the forward portion 256.

Figure 3:
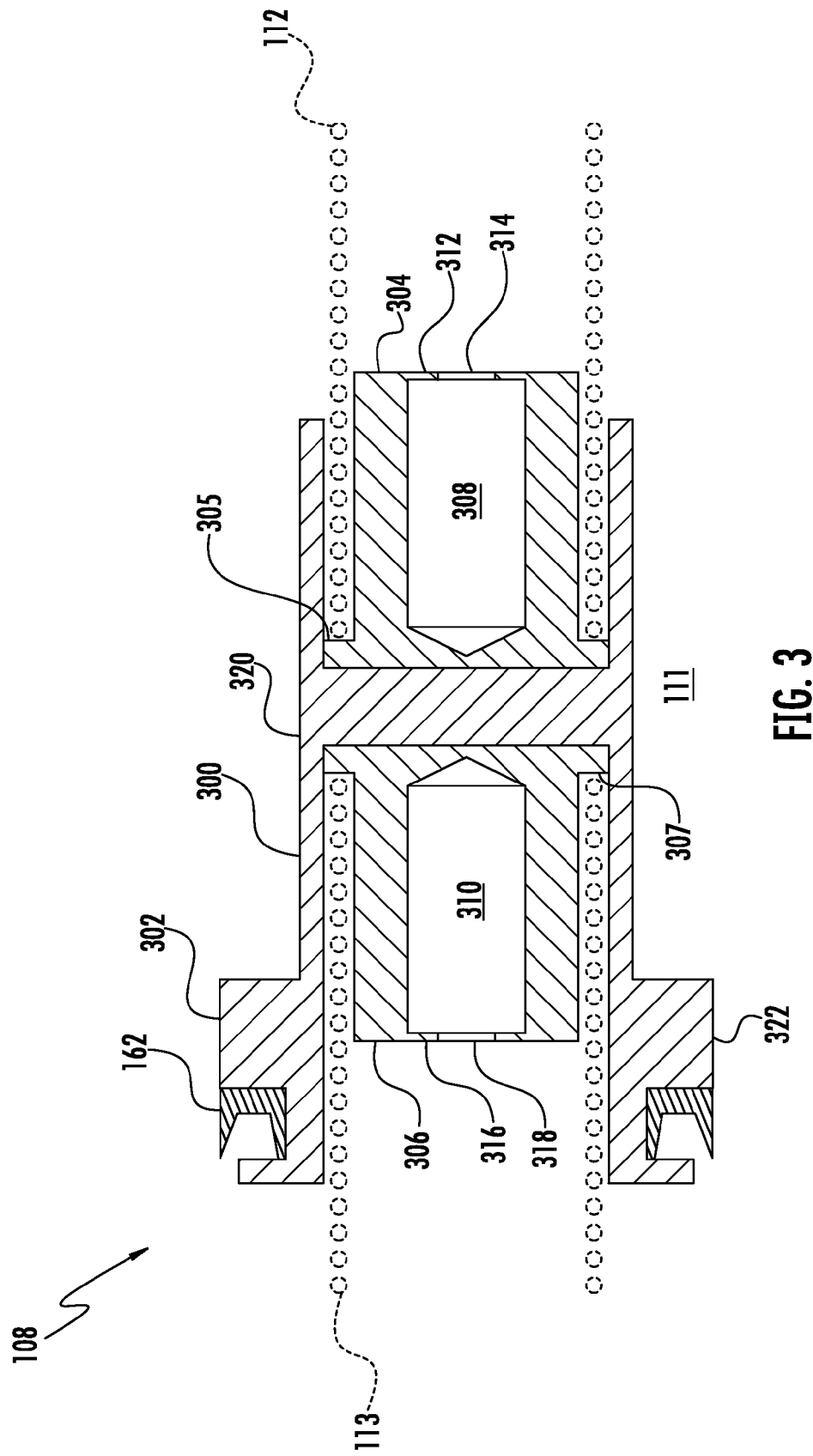
FIG. 3 depicts a cross sectional view of the secondary piston assembly, depicted in FIG. 1.

Referring to FIG. 3, the secondary piston assembly 108 is depicted. The secondary piston assembly 108 includes a body portion 300, a forward portion 302, a rear member 304, and a front member 306. While the rear member 304, the body portion 300, and the forward member 306 are depicted as three separate members, the reader should appreciate that these members may be integrally formed as a single component.

The rear and forward members 304 and 306 include shoulders 305 and 307, respectively, for receiving ends of the springs 112 and 113 (shown in phantom). Therefore, a biasing force generated by the spring 112 may be exerted on the shoulder 305 of the rear member 304 which is configured to transfer the biasing force to the body portion 300 and to the forward member 306. Similarly, a biasing force generated by the spring 113 may be exerted on the shoulder 307 of the front member 306 which is configured to transfer the biasing force to the body portion 300 and to the rear member 304.

The rear and front members 304 and 306 include cavities 308 and 310 for receiving head portions 362 of shafts 360 of the poppet valve assemblies 106 and 110, respectively, as described in further detail below with reference to FIG. 4. The rear member 304 terminates in a washer 312 which defines an opening 314. The inner diameter of the opening 314 is larger than the outer diameter of the shaft 360 and smaller than the diameter of the head portion 362 of the poppet valve assemblies 106/110. Similarly, the front member 306 terminates in a washer 316 which defines an opening 318. The inner diameter of the opening 318 is larger than the outer diameter of the shaft 360 and smaller than the diameter of the head portion 362 of the poppet valve assemblies 106/110.

The body portion 300 defines an outer diameter 320 which is smaller than an outer diameter 322 of the front portion 302.

The difference between these outer diameters defines the cavity 111 (see FIG. 1). The front portion 302 defines a seal housing for the seal 162.

Figure 4:
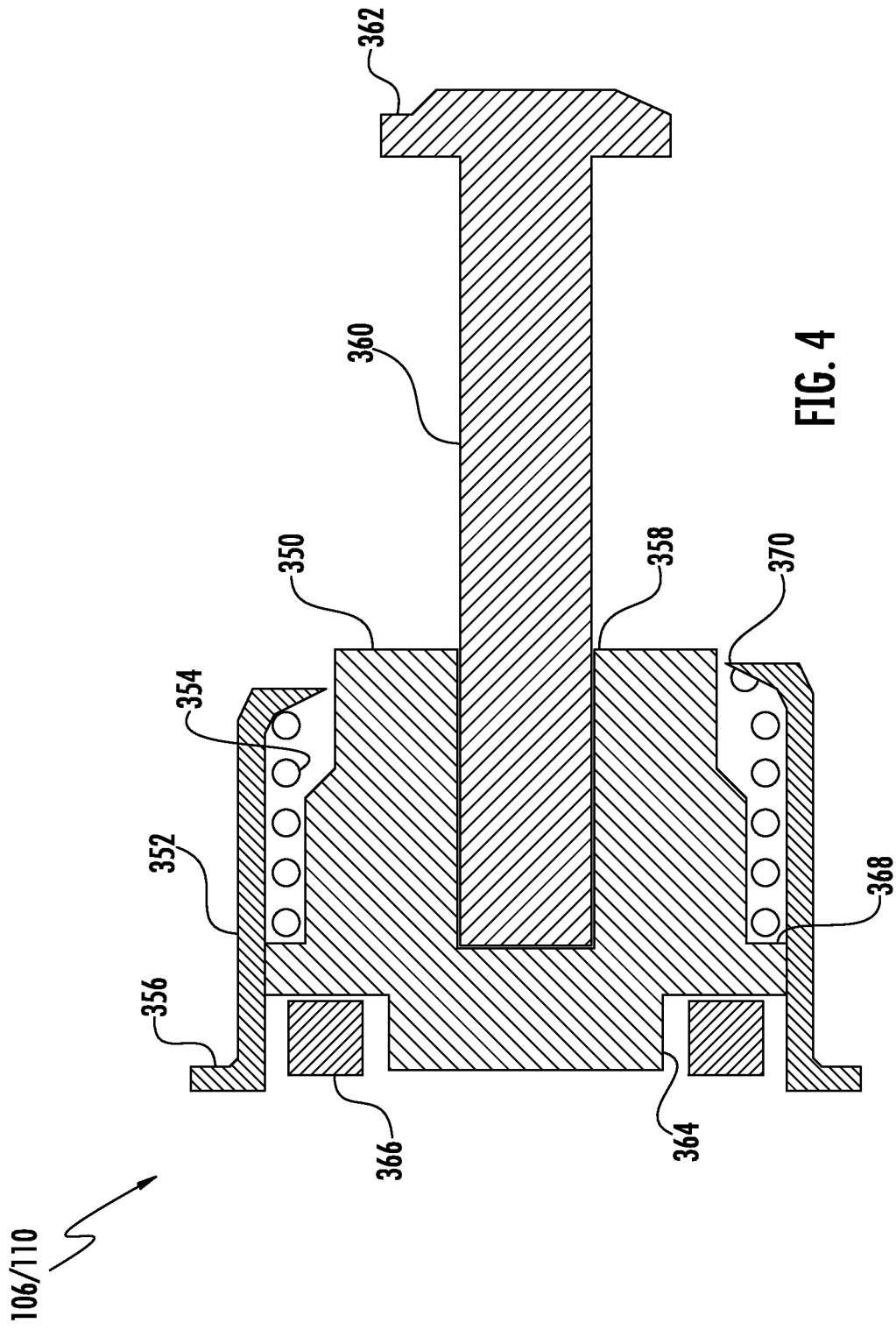
FIG. 4 depicts a cross sectional view of one of the poppet valve assemblies, depicted in FIG. 1.

Referring to FIG. 4, a cross sectional view of the poppet valve assemblies 106/110 is depicted. The poppet valve assembly 106/110 includes a valve body 350, a valve bracket 352, and a valve spring 354. The valve body 350 includes an outfacing shoulder 368. The valve bracket 352 defines an outfacing shoulder 356 and an in-facing shoulder 370. The outfacing shoulders 356 of the poppet valve assemblies 106 and 110 are configured to receive one end of the springs 112 and 113, respectively. The outfacing shoulder 368 and the in-facing shoulder 370 are configured to receive ends of the valve spring 354. Therefore, the spring 354 biases the in-facing shoulder 370 of the valve bracket 352 away from the outfacing shoulder 368 of the valve body 350.

The spring 112 biases the outfacing shoulder 356 of the poppet valve assembly 106 away from the valve body 350 until the outfacing shoulder 356 is firmly seated on the sealing surface 264 of the forward area of the central portion 254 (see also FIG. 2). Similarly, the spring 113 biases the outfacing shoulder 356 of the poppet valve assembly 110 away from the valve body 350 until the outfacing shoulder 356 is firmly seated on end wall 172 (see also FIG. 1).

The poppet spring 354 of the poppet valve assembly 106 has a lower spring constant than the spring 112. Similarly, the poppet spring 354 of the poppet valve assembly 110 has a lower spring constant than the spring 113.

The valve body 350 defines a bore 358 which partially extends an axial length of the valve body 350. The bore 358 is configured to receive a portion of the shaft 360 in a press fit manner, or any other manner in which the shaft 360 is fixedly coupled to the valve body 350, e.g., by using a set screw.

The valve body 350 also includes a housing 364 for a seal 366. The seal 366 of the poppet valve assembly 106 is configured to make contact and thereby seal against the sealing surface 264 of the central portion 254 (see also FIGS. 1 and 2). Similarly, the seal 366 of the poppet valve assembly 110 is configured to contact and thereby seal against the sealing surfaces formed by the end wall 172 of the master cylinder assembly 102 on two sides of the opening defined by the fluid channel 114.

The operation of the braking system 100 is described herein with initial reference to FIG. 1. In operation, the input shaft (not shown) is coupled to a boost system (not shown). The input shaft (not shown) is configured to convey movement of a brake pedal (not shown) to a linear movement of the input shaft (not shown) coupled to the rear portion 252 of the primary piston assembly 104 with assistance of the boost system (not shown). With the brake pedal (not shown) in a released position (i.e., in an unapplied position), the braking system is as depicted in FIG. 1, and is hereinafter referred to as the "rest" position. In FIG. 1 the spring 112 biases the secondary piston assembly 108 away from the outfacing shoulder 356 of the poppet valve assembly 106 (see FIG. 4), thereby causing the outfacing shoulder 356 to be firmly seated on the sealing surface 264 of the central portion 254 of the first piston assembly 104 (see FIG. 2). Similarly, the spring 113 biases the secondary pitons assembly 108 away from the outfacing shoulder 356 of the poppet valve assembly 110, thereby causing the outfacing shoulder 356 to be firmly seated on the end wall 172 of the master cylinder assembly 102.

At the same time, the valve springs 354 of the poppet valve assemblies 106/110 bias the outfacing shoulders 368 of the valve bodies 350 away from the in-facing shoulders 370 of the valve brackets 352. These biasing forces tend to move the valve bodies 350 and the shafts 360 fixedly coupled to the valve bodies 350 and the integrally formed head portions 362 rightward (the poppet valve assembly 106), and leftward (the poppet valve assembly 110), with reference to FIG. 1 (see also FIG. 4).

Since the washers 312/316 defining the openings 314/318 have an inner diameter that is smaller than the outer diameter of the head portions 362, movement of the head portions 362 is limited by the washers 316. As a result, the seals 366 are not able to seal against their complementary sealing surfaces, described above. Therefore, the fluid channel 262, which is in continuous fluid communication with the reservoir (not shown), is in fluid communication with the primary pressure chamber 124. Similarly, the secondary pressure chamber 126 is in fluid communication with the reservoir (not shown) via the fluid channel 114.

Since the primary pressure chamber 124 is in continuous fluid communication with a primary downstream braking circuit (not shown), the pressure therein is the same as the pressure of the reservoir (not shown). Similarly, since the secondary pressure chamber 126 is in continuous fluid communication with a secondary downstream braking circuit (not shown), the pressure therein is the same as the pressure of the reservoir (not shown). Therefore, with the braking system 100 in the rest position, no braking is generated at the downstream braking circuits (not shown).

Figure 5:
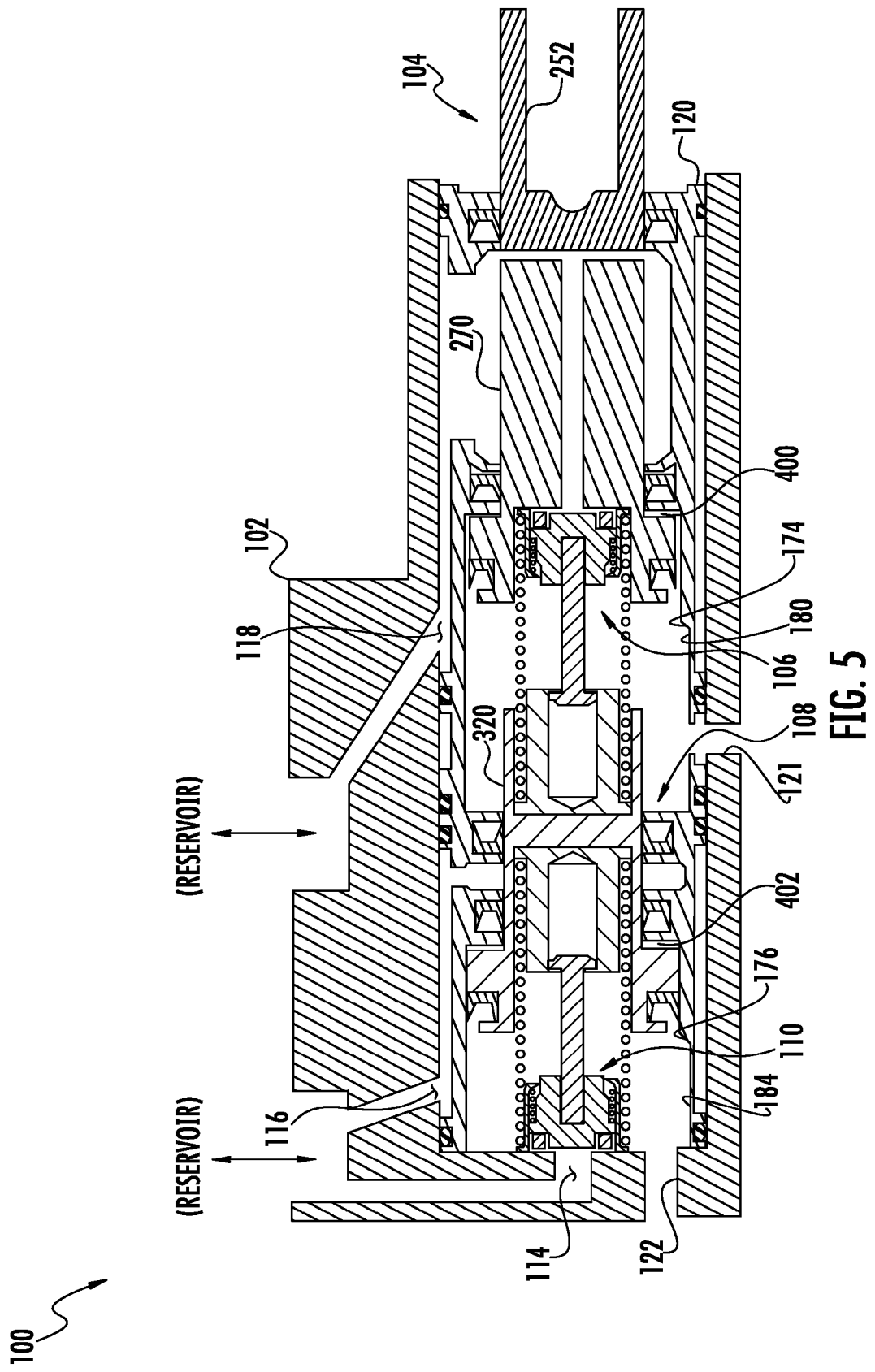
FIG. 5 depicts a partial cross sectional view of the braking system depicted in FIG. 1 in an initial activation position.

With reference to FIG. 5, when braking is first initiated (i.e., when the operator of the vehicle applies a force to the brake pedal (not shown)), the input shaft (not shown) coupled to the rear portion 252 of the primary piston assembly 104, travels leftward which causes the primary piston assembly 104 to travel leftward. The leftward travel of the primary piston assembly 104 compresses the springs 112 and 113, which thereby increases the biasing force generated by these springs 112 and 113. Compressions of the springs 112/113 generate the potential for (i) for the seals 366 to firmly seat against their respective seating surfaces, described above, and (ii) for the head portions 362 of the shafts 360 to move within their respective cavities 308 and 310. Initially the first option (i.e., seating of the seals 366 on their respective seating surfaces) occurs. After the seals are firmly seated, continued compressions of the springs 112/113 result in the second option.

Movements of the primary and secondary piston assemblies 104/108 are dependent on the spring constants of the springs 112 and 113. For example, if the spring constants of the springs 112 and 113 are equal, then for every unit of leftward travel of the primary piston assembly 104 the distance between the primary and secondary piston assemblies 104/108 is reduced by half (½) the same unit. Also, with equal spring constants for the springs 112/113, the poppet valve assemblies 106 and 110 travel equally with respect to the primary and secondary piston assemblies 104 and 108.

With the poppet valve assemblies 106/110 sealed against their respective sealing surfaces, fluid communication between the reservoir (not shown) and the primary pressure chamber 124 is cutoff. Specifically, fluid communication through the fluid channel 118 (i.e., through the bore 260 of the central portion 254 of the primary piston assembly 104) and around the poppet valve assembly 106 is cutoff. In addition, fluid communication between the reservoir (not shown) and the secondary pressure chamber 126 is cutoff. Specifically, fluid communication through the fluid channel 114 and around the poppet valve assembly 110 is cutoff.

Once the primary and secondary pressure chambers 124 and 126 are isolated from the reservoir (not shown), further leftward movement of the primary and secondary piston assemblies 104 and 108 transfer fluids from the primary and secondary pressure chambers 124/126 to the downstream braking circuits (not shown) via the fluid channels 121 and 122.

Figure 6:
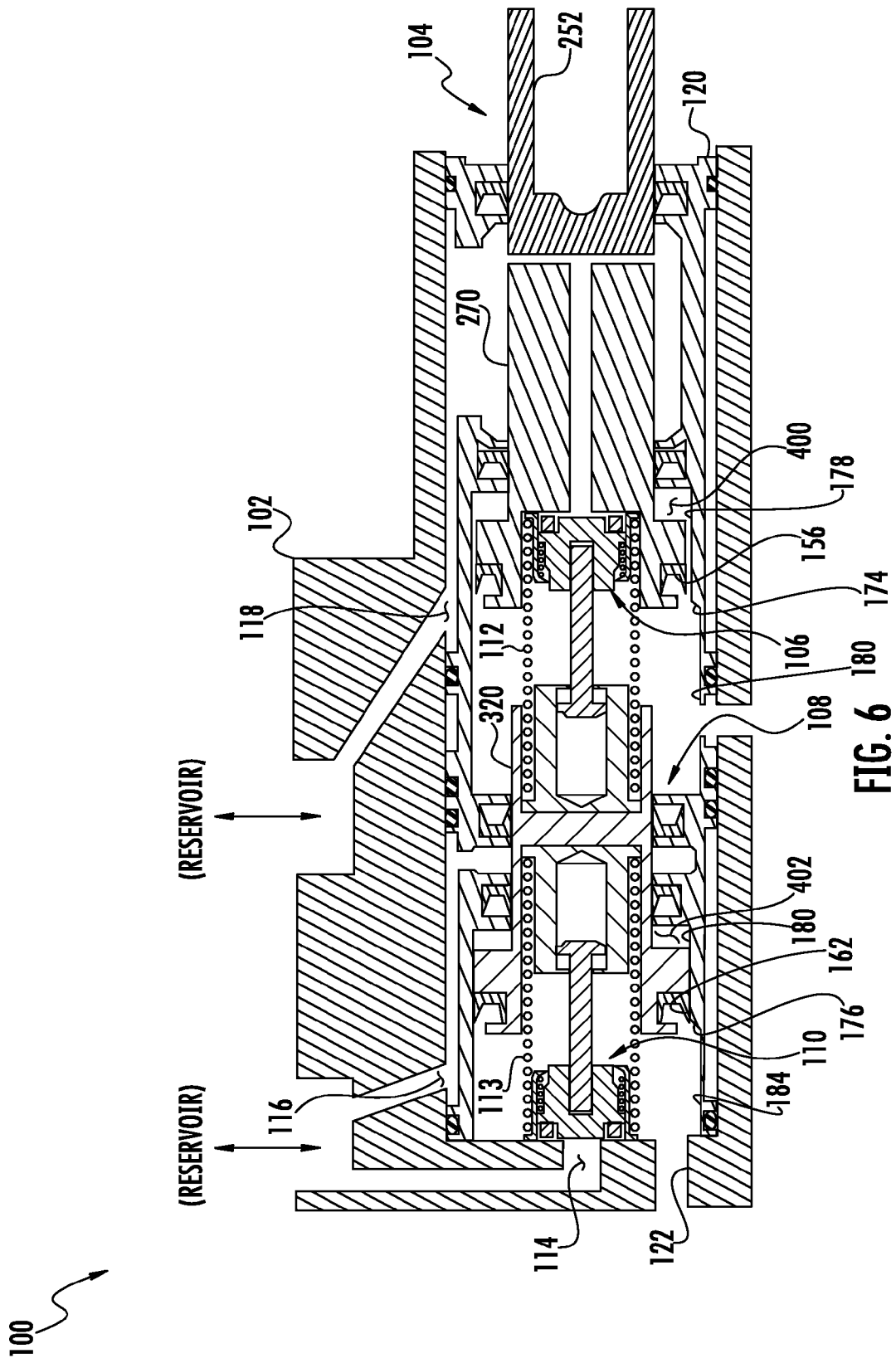
FIG. 6 depicts a partial cross sectional view of the braking system depicted in FIG. 1 in a first subsequent activation position.

Referring to FIG. 6, a first subsequent activation position of the braking system 100 is depicted in response to application of additional force to the brake pedal (not shown) by the operator. The additional leftward movement of the primary and secondary piston assemblies 104/108 as compared to the positions of the assemblies depicted in FIG. 5 has brought the seal 156 and 162 proximate to the diameter transition points 174/176. In doing so, two cavities 400/402 are formed between the primary piston assembly 104 and the secondary piston assembly 108. While the seals 156/162 are positioned to seal against the smaller diameters 178/180, the cavities 400/402 are in fluid communication with the reservoir (not shown) via the fluid channels 118 and 116. Therefore, the pressure within these cavities 400/402 is approximately the same as the pressure within the reservoir (not shown).

With the seals 156/162 to the right of the diameter transition points 174/176, large amounts of fluid transfer occurs between the master cylinder assembly 102 and the downstream braking circuits via the fluid channels 121 and 122 in response to leftward movement of the primary and secondary piston assemblies 104/108. Because of the larger diameters 180/184, larger fluid quantities are transferred to the downstream braking circuits (not shown) as compared to a braking system that is based on smaller diameters 270/320, as further described below. The larger fluid quantities provide the desired fast fill function of the braking system 100. The fast fill function reduces the difference in the feel of the brake pedal (not shown) during the initial activation period when pressure buildup in the braking system is significantly reduced until friction members of the braking system come into contact with their complementary braking surfaces.

The fluid transfer based on the larger diameters 180/184 may require additional force applied to the input shaft (not shown), however. As described above, the input shaft (not shown) is coupled to the boost system (not shown) in order to assist moving the primary piston assembly 104. The larger force required to move the primary and secondary piston assemblies 104/108 may require the boost system (not shown) to be dimensioned so that it can provide the assist as compared to a braking system that is based only on the smaller diameters 270/320.

The reader should note, however, that during the initial activation period, since the pressure buildup is significantly reduced, the forces required to move the primary and secondary piston assemblies 104/108 are smaller. Therefore, the braking system 100 may be so dimensioned that the desired fast-fill is completed as soon as the seals 156/162 reach the diameter transition points 174/176. As a result, the boost system (not shown) need not be dimensioned to be able to provide the larger force, described above.

Figure 7:
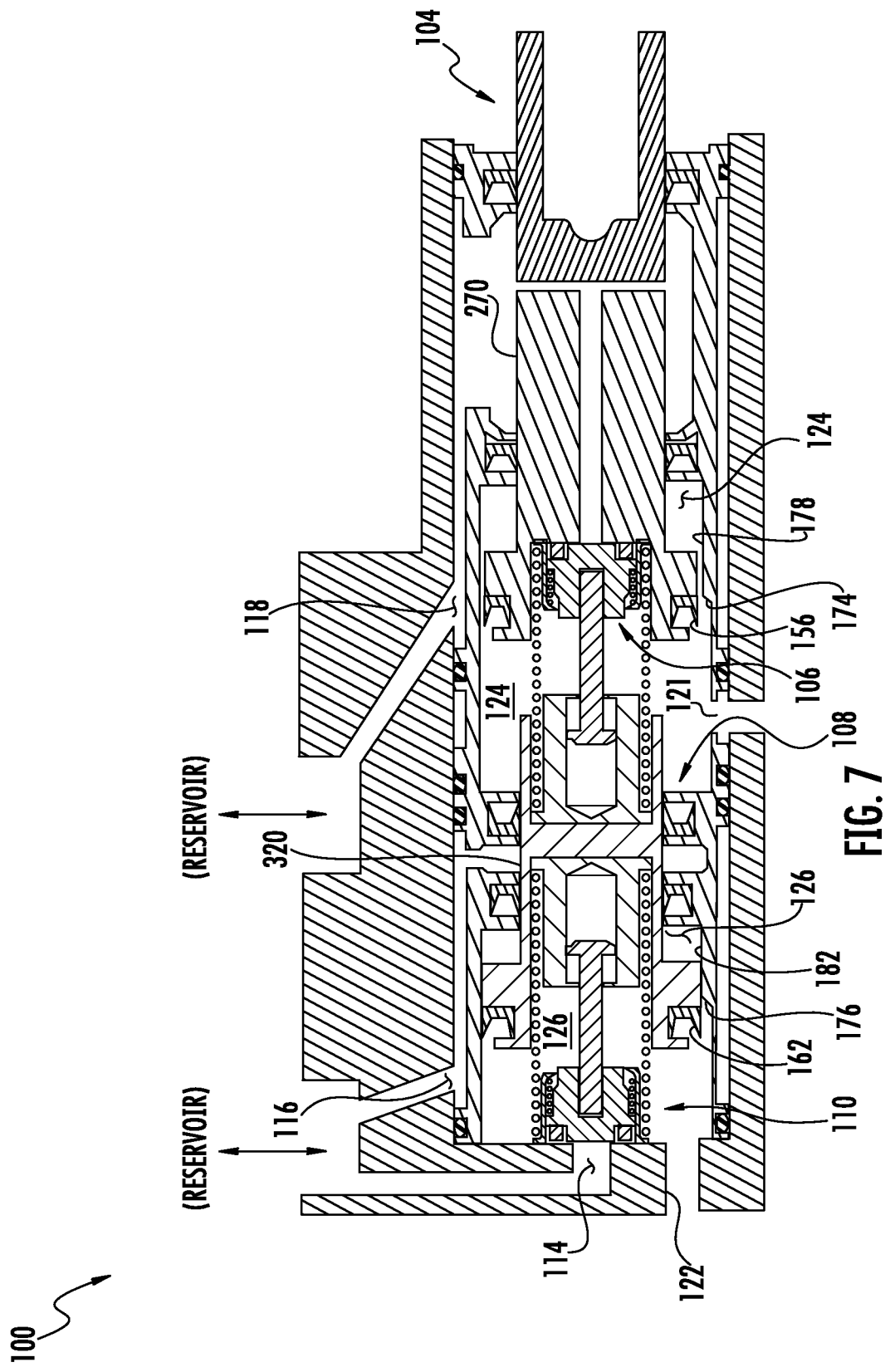
FIG. 7 depicts a partial cross sectional view of the braking system depicted in FIG. 1 in a second subsequent activation position.

Further application of force to the brake pedal (not shown) by the operator results in further leftward movement of the primary piston assembly 104 from what is depicted in FIG. 6. Referring to FIG. 7, a second subsequent activation position of the braking system 100 is depicted. Since the primary and secondary pressure chambers 124 and 126 remain isolated from the reservoir (not shown), the additional leftward movement of the primary piston assembly 104 and the secondary piston assembly 108 results in additional pressurization of fluid within these chambers 124 and 126.

As depicted in FIG. 7, the seals 156 and 162 have crossed the diameter transition points 174 and 176, respectively. Therefore, these seals 156/162 provide no further sealing function (i.e., sealing the primary and secondary piston assemblies 104/108 against the sleeve assembly 120). Once the seals 156/162 cross the diameter transition points 174/176, only the seals 154/160 provide the sealing function provided previously by the seals 156/162. The seals 154/160, however, seal against diameters 270/320 of the primary and secondary piston assemblies 104/108.

Therefore, fluid transfer from the master cylinder assembly 102 to the downstream braking circuits (not shown) after the seals 156/162 cross the diameter transition points 174/176 is based on the smaller primary and secondary piston diameters 270/320. Because of the smaller diameters 270/320, and thereby smaller quantities of fluid transfer, the force required to move the primary and secondary piston assemblies 104/108 and which is provided by the boost system (not shown) is smaller.

Immediately after the seal 156/162 cross the diameter transition points 174/176, the previously formed cavities 400/402 which were at or slightly below the pressure of the reservoir (not shown) are integrated with the larger primary and secondary pressure chambers 124/126. Therefore, the fluid volumes that were collected in the cavities 400/402 are further added to the downstream braking circuits (not shown), additionally providing the desired fast fill function.

The reader should note that the head portions 362 of the shafts 360 are disposed within the cavities 308 and 310, as depicted in FIGS. 6 and 7. The head portions 362 slide into the cavities 308/310 as the primary and secondary pistons assemblies 104/108 move further leftward.

When the operator of the vehicle partially releases the brake pedal (not shown), the input shaft (not shown) moves rightward, moving with it the rear portion 252 of the primary piston assembly 104. Fluid within the downstream braking circuits (not shown) returns to the master cylinder assembly 102 via fluid channels 121/122 based on the primary and secondary piston diameters 270/320 until the seals 156/162 cross the diameter transition points 174/176. At that point, fluid is transferred between the downstream braking circuits (not shown) and the master cylinder assembly 102 based on the larger diameters 180/184. Also, fluids within the cavities 400/402 are returned to the reservoir (not shown) via fluid channels 118 and 116.

Further release of the brake pedal (not shown) allows the seals 366 to unseat from their respective sealing surfaces, as described above, due to further rightward movement of the primary and secondary piston assemblies 104/108. The braking of the seals 366 places the primary and secondary pressure chambers 124 and 126 in fluid communication with the reservoir (not shown) via the fluid channels 114/118.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A fast fill braking system comprising:
a master cylinder;
a primary pressure chamber including a primary chamber transition point and having a first chamber portion on a first side of the primary chamber transition point and located forwardly of a second chamber portion located on a second side of the primary chamber transition point, the first chamber portion having a diameter larger than a diameter of the second chamber portion; and
a primary piston including a first piston portion positioned within the primary pressure chamber and a second piston portion extending out of the primary pressure chamber, the first piston portion having a diameter (i) larger than a diameter of the second piston portion, and (ii) complementary to the diameter of the second chamber portion, wherein the primary piston is configured to locate a part of the first piston portion on the first side of the primary chamber transition point in a forward position and to locate the first piston portion on the second side of the primary chamber transition point in a rearward position.

2. The system of claim 1, further comprising:
a secondary pressure chamber having a third chamber portion located forwardly of a fourth chamber portion, the third chamber portion having a diameter larger than a diameter of the fourth chamber portion; and
a secondary piston including a third piston portion positioned within the secondary pressure chamber and a fourth piston portion extending out of the secondary pressure chamber, the third piston portion having a diameter (i) larger than a diameter of the fourth piston portion, and (ii) complementary to the diameter of the fourth chamber portion.

3. The system of claim 2, wherein the diameter of the third piston portion is less than each of the diameters of third chamber portion and the fourth chamber portion.

4. The system of claim 1, wherein the first piston portion includes a first piston forward portion and a first annular seal mounted on the first piston forward portion and (i) configured to sealingly engage the diameter of the second chamber portion when the primary piston is in the rearward position and (ii) configured to not sealingly engage the first chamber portion when the primary piston is in the forward position.

5. The system of claim 4, further comprising:
a secondary pressure chamber including a secondary chamber transition point and having a third chamber portion on a first side of the secondary chamber transition point and located forwardly of a fourth chamber portion located on a second side of the secondary chamber transition point, the third chamber portion having a diameter larger than a diameter of the fourth chamber portion; and
a secondary piston including a third piston portion positioned within the secondary pressure chamber and a fourth piston portion extending out of the secondary pressure chamber, the third piston portion having a diameter (i) larger than a diameter of the fourth piston portion, and (ii) complementary to the diameter of the fourth chamber portion, wherein the secondary piston is configured to locate a part of the secondary piston portion on the first side of the secondary chamber transition point in a forward position and to locate the secondary piston portion on the second side of the secondary chamber transition point in a rearward position.

6. The system of claim 5, wherein the second piston portion includes a second piston forward portion and a second annular seal mounted on the second piston forward portion and (i) configured to sealingly engage the diameter of the fourth chamber portion when the secondary piston is in the rearward position and (ii) configured to not sealingly engage the diameter of the third chamber portion the secondary piston is in the forward position.

7. A fast fill braking system comprising:
a master cylinder;
a primary pressure chamber having a first chamber portion located forwardly of a second chamber portion, the first chamber portion having a diameter larger than a diameter of the second chamber portion;
a primary piston including a first piston portion positioned within the primary pressure chamber and a second piston portion extending out of the primary pressure chamber, the first piston portion having a diameter (i) larger than a diameter of the second piston portion, and (ii) complementary to the diameter of the second chamber portion;
a first annular seal extending about the first piston portion and (i) configured to sealingly engage the second chamber portion when the first piston portion is within the second chamber portion and the primary piston is moving in a forward direction, and (ii) configured to not sealingly engage the first chamber portion when the first piston portion is within the first chamber portion and the primary piston is moving in the forward direction; and
a second annular seal positioned outside of the primary pressure chamber and configured to sealingly engage the second piston portion when the second piston portion is moving in the forward direction.

8. A fast fill braking system comprising:
a master cylinder;
a primary pressure chamber having a first chamber portion located forwardly of a second chamber portion, the first chamber portion having a diameter larger than a diameter of the second chamber portion;
a primary piston including a first piston portion positioned within the primary pressure chamber and a second piston portion extending out of the primary pressure chamber, the first piston portion having a diameter (i) larger than a diameter of the second piston portion, and (ii) complementary to the diameter of the second chamber portion;
a secondary pressure chamber having a third chamber portion located forwardly of a fourth chamber portion, the third chamber portion having a diameter larger than a diameter of the fourth chamber portion;
a secondary piston including a third piston portion positioned within the secondary pressure chamber and a fourth piston portion extending out of the secondary pressure chamber, the third piston portion having a diameter (i) larger than a diameter of the fourth piston portion, and (ii) complementary to the diameter of the fourth chamber portion;
a first annular seal extending about the first piston portion and (i) configured to sealingly engage the second chamber portion when the first piston portion is within the second chamber portion and the primary piston is moving in a forward direction, and (ii) configured to not sealingly engage the first chamber portion when the first piston portion is within the first chamber portion and the primary piston is moving in the forward direction; and
a second annular seal positioned outside of the primary pressure chamber and configured to sealingly engage the second piston portion when the second piston portion is moving in the forward direction.

9. The system of claim 8, further comprising:
a sleeve positioned within the master cylinder, the sleeve defining the primary pressure chamber and the secondary pressure chamber.

10. The system of claim 9, further comprising:
a first poppet valve positioned within a first cavity in the first piston portion.

11. The system of claim 10, further comprising:
a second poppet valve located in the secondary pressure chamber, the second poppet valve aligned with a second cavity in the third piston portion such that at least a portion of the second poppet valve is received within the second cavity when the secondary piston is at a forward position.

12. The system of claim 9, the sleeve further comprising;
a first generally cylindrical portion defining the first chamber portion;
at least one groove extending axially along the first generally cylindrical portion; and
a second cylindrical portion defining the second chamber portion.

13. The system of claim 9, wherein the second annular seal is located within an annular groove in the sleeve.

14. A fast fill braking system comprising:
a brake cylinder;
a primary pressure chamber fixedly defined within the cylinder and including
a first chamber portion having a first diameter, and
a second substantially cylindrical chamber having a second diameter, the second diameter less than the first diameter;
a primary piston including
a first large diameter portion positioned within the primary pressure chamber, and
a second small diameter portion, the second small diameter portion extending rearwardly of the first large diameter portion and having a diameter smaller than a diameter of the first large diameter portion; and
a first annular seal mounted on the first large diameter portion and (i) configured to sealingly engage the second substantially cylindrical chamber when the first large diameter portion is within the second substantially cylindrical chamber and the primary piston is moving in a forward direction, and (ii) configured to not sealingly engage the first chamber portion when the first large diameter portion is within the first chamber portion and the primary piston is moving in the forward direction.

15. The system of claim 14, further comprising:
a secondary pressure chamber fixedly defined within the cylinder and including
a third chamber portion having a third diameter, and
a fourth substantially cylindrical chamber having a fourth diameter, the fourth diameter less than the third diameter;
a secondary piston including
a third large diameter portion positioned within the secondary pressure chamber, and
a fourth small diameter portion, the fourth small diameter portion extending rearwardly of the third large diameter portion and having a diameter smaller than a diameter of the fourth large diameter portion; and
a second annular seal mounted on the third large diameter portion and (i) configured to sealingly engage the fourth substantially cylindrical chamber when the third large diameter portion is within the fourth substantially cylindrical chamber and the secondary piston is moving in the forward direction, and (ii) configured to not sealingly engage the third chamber portion when the third large diameter portion is within the third chamber portion and the secondary piston is moving in the forward direction.

* * * * *